(12) United States Patent
Kobayashi

(10) Patent No.: US 11,656,824 B2
(45) Date of Patent: May 23, 2023

(54) IMAGE FORMING SYSTEM

(71) Applicant: KYOCERA Document Solutions Inc., Osaka (JP)

(72) Inventor: Yasuyoshi Kobayashi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/610,583

(22) PCT Filed: Mar. 17, 2020

(86) PCT No.: PCT/JP2020/011761
§ 371 (c)(1),
(2) Date: Nov. 11, 2021

(87) PCT Pub. No.: WO2020/230447
PCT Pub. Date: Nov. 19, 2020

(65) Prior Publication Data
US 2022/0317960 A1 Oct. 6, 2022

(30) Foreign Application Priority Data
May 16, 2019 (JP) .............................. JP2019-093154

(51) Int. Cl.
*G06F 3/12* (2006.01)
(52) U.S. Cl.
CPC .......... *G06F 3/1273* (2013.01); *G06F 3/1205* (2013.01); *G06F 3/1238* (2013.01); *G06F 3/1253* (2013.01)

(58) Field of Classification Search
CPC .... G06F 3/1273; G06F 3/1205; G06F 3/1238; G06F 3/1253; G06F 3/12; G06F 3/1203; G06F 3/1259
See application file for complete search history.

(56) References Cited

U.S. PATENT DOCUMENTS

2006/0245006 A1   11/2006   Nakata et al.
2011/0299106 A1*  12/2011   Mori ................. G06F 3/1288
                                                             358/1.9
(Continued)

FOREIGN PATENT DOCUMENTS

JP   2006-309673 A   11/2006

*Primary Examiner* — Iriana Cruz
(74) *Attorney, Agent, or Firm* — IP Business Solutions, LLC

(57) ABSTRACT

An image forming apparatus (10) includes a display device (21), a controller (28), a storage device (26), and an operation device (22). The controller (28) executes a job. In the storage device (26), setting information of the job is stored, each time the controller (28) executes the job, in association with date and time of execution of the job, as job history. The controller (28) determines a search period according to date and time of operation performed by a user, and retrieves the job setting information the date and time of execution of which is included in the search period, from the job history stored in the storage device (26). The controller (28) causes the display device (21) to display the job setting information retrieved. The operation device (22) receives an execution instruction of a job to which the job setting information displayed on the display device (21) is applied, from the user. The controller (28) further executes the job according to the execution instruction received by the operation device (22), by applying the job setting information to the job.

3 Claims, 10 Drawing Sheets

(56) References Cited

U.S. PATENT DOCUMENTS

2019/0362708 A1* 11/2019 Kitaguchi ............... G10L 15/26
2020/0177747 A1* 6/2020 Yasuda .............. H04N 1/00403

* cited by examiner

Fig.3

JOB HISTORY INFORMATION HDA

| TYPE OF JOB | JOB SETTING INFORMATION JD | DATE AND TIME OF EXECUTION | SETUP TIME | IDENTIFICATION INFORMATION ID |
|---|---|---|---|---|
| COPY | COLOR, NUMBER OF COPIES... | 2019/04/01(TUE) 11:15 | 0:15 | AAA |
| FAX | B/W, NUMBER OF COPIES... | 2019/04/01(TUE) 13:45 | 1:05 | CCC |
| SCAN | COLOR, NUMBER OF COPIES... | 2019/04/02(WED) 14:38 | 0:22 | AAA |
| FAX | B/W, NUMBER OF COPIES... | 2019/04/02(WED) 16:50 | 0:45 | AAA |

Fig.4

JOB HISTORY INFORMATION HDB

| TYPE OF JOB | JOB SETTING INFORMATION JD | DATE AND TIME OF EXECUTION | SETUP TIME | DATA AMOUNT | MODEL INFORMATION KD |
|---|---|---|---|---|---|
| COPY | COLOR, NUMBER OF COPIES··· | 2019/01/07(MON) 9:17 | 0:00 | 610·· | Ka |
| COPY | COLOR, NUMBER OF COPIES··· | 2019/01/07(MON) 9:53 | 0:00 | 120.3·· | Ka |
| SCAN | COLOR, NUMBER OF COPIES··· | 2019/01/07(MON) 13:14 | 0:18 | 220.9·· | Kc |
| FAX | B/W, NUMBER OF COPIES··· | 2019/01/08(TUE) 15:08 | 1:30 | 324·· | Ka |

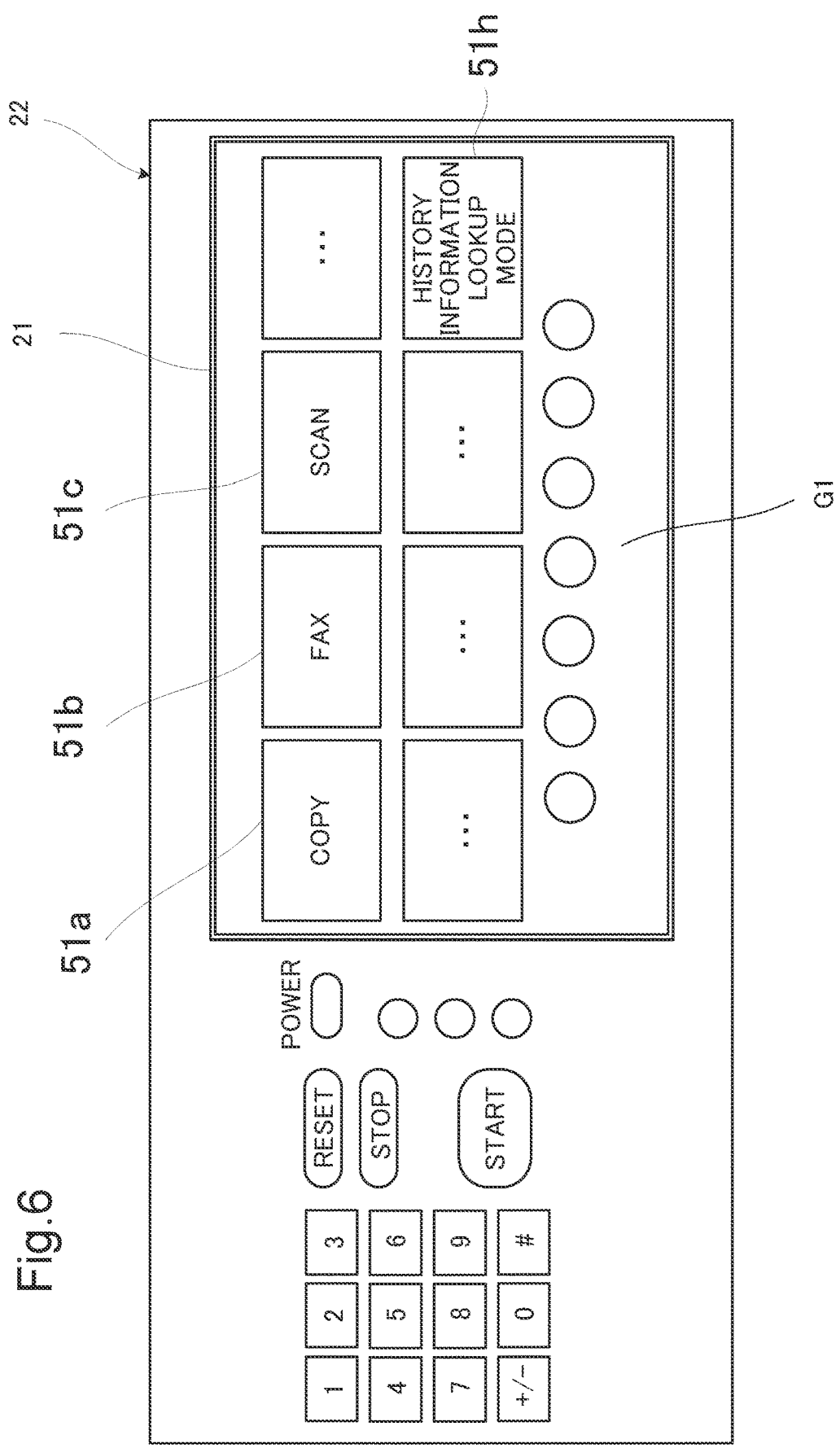

Fig.7

| HISTORY INFORMATION OF ALL JOBS | | |
|---|---|---|
| TYPE OF JOB | DATE AND TIME OF EXECUTION | SETTING INFORMATION |
| COPY | 2019/03/15(WED)9:03 | COLOR |
| SCAN | 2019/03/15(WED)9:19 | USB |
| FAX | 2019/03/16(THU)9:53 | 066-00-0000(Mr.A) |
| SCAN | 2019/03/16(THU)10:16 | MAIN MEMORY |
| FAX | 2019/03/16(THU)14:12 | 033-00-0000(Ms.B) |
| COPY | 2019/03/16(THU)15:00 | B/W |

17 — 61
THURSDAY — 62
SEARCH — 63
SET — 64
65 — (search box)
21

Fig.8

USER HISTORY INFORMATION
SEARCH PERIOD 2019/03/15~17

| TYPE OF JOB | SETTING INFORMATION | NUMBER OF COPIES |
|---|---|---|
| COPY | B/W | 100 |
| COPY | B/W | 68 |
| COPY | COLOR | 120 |
| FAX | 066-00-0000(Mr.A) | 8 |
| FAX | 033-00-0000(Ms.B) | 6 |
| SCAN | USB | 21 |

SEARCH — 63
SET — 64

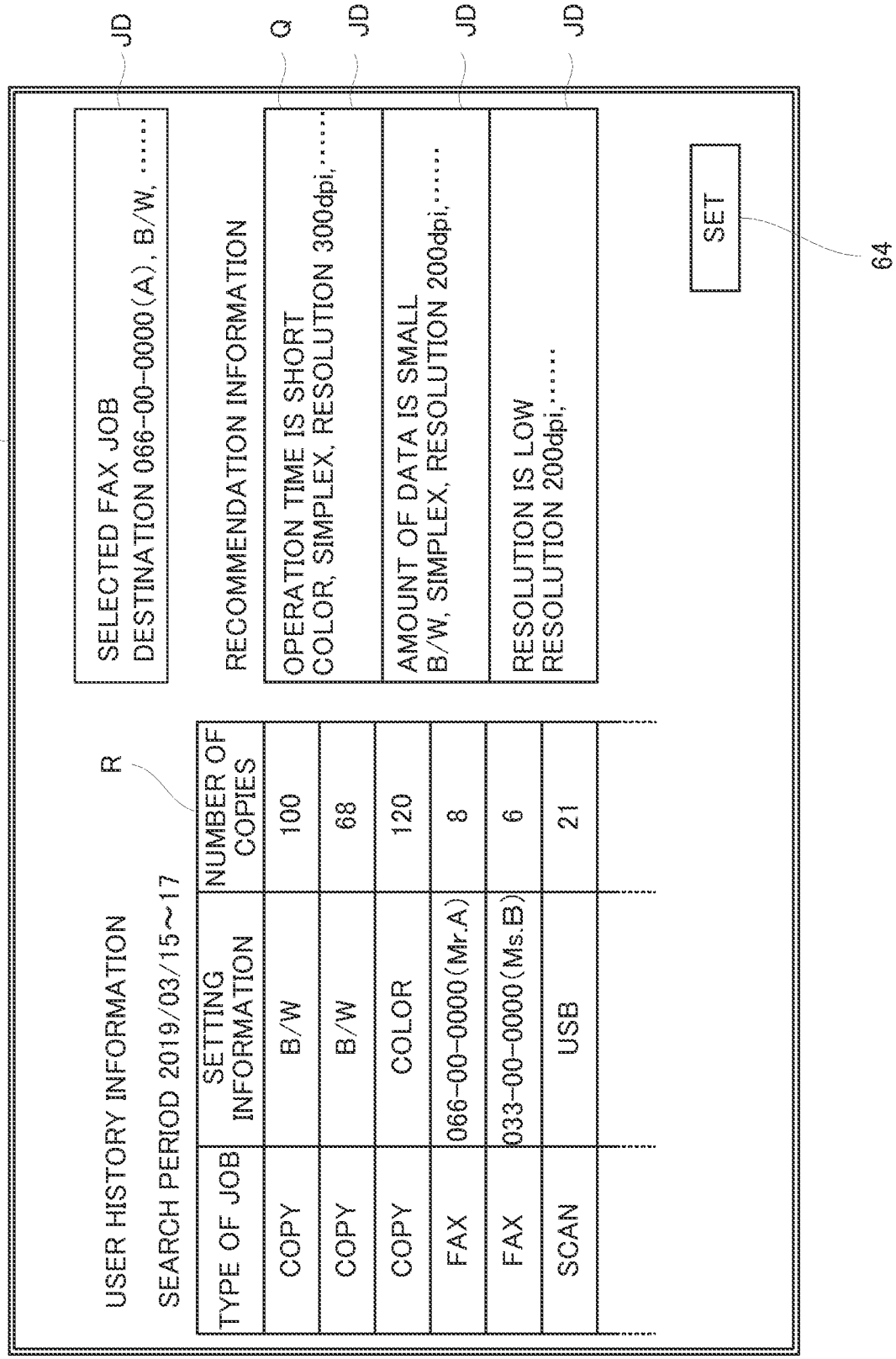

IMAGE FORMING SYSTEM

TECHNICAL FIELD

The present invention relates to an image forming system for executing jobs such as copying and printing, and in particular to a technique to assist an operation for inputting setting information of the job.

BACKGROUND ART

When an image forming apparatus is used, job setting information about a job, such as whether color or B/W, and the number of copies to be printed, is specified before the execution of the copying or printing job. However, the ongoing increase in number of functions of the image forming apparatus is making the operation to specify the job setting information more complicated and troublesome. Accordingly, attempts have been made to simplify the operation, such as saving history information of the job setting information, selecting the job setting information of a high execution frequency on the basis of the history information, and reflecting the content of the selected job setting information in job setting information to be newly specified.

In addition, Patent Literature (PTL) 1 discloses an image processing apparatus configured to store job history representing detail of image processing, each time the image processing is executed, execute the image processing according to the processing detail specified by the user, and then predict the image processing detail to be specified by the user for the next image processing job, on the basis of the job history, thereby improving the user-friendliness of the apparatus.

CITATION LIST

Patent Literature

PTL 1: Japanese Unexamined Patent Application Publication No. 2006-309673

SUMMARY OF INVENTION

Technical Problem

Now, the user sometimes repeats similar jobs in a low execution frequency, such as once a week or once a month, to carry out a weekly or monthly business routine. In such a case, the foregoing method, including saving the history information of the job setting information, selecting the job setting information of a high execution frequency on the basis of the history information, and reflecting the content of the selected job setting information in the new job setting information, is unable to detect the job executed in such a low execution frequency, to simplify the operation for applying the setting information of the job.

Further, since the technique according to Patent Literature 1 is intended to predict the image processing detail to be specified next by the user, on the basis of the job history, the technique is inapplicable to detecting a job executed in a low execution frequency, thereby simplifying the operation to specify the setting information of the job.

The present invention has been accomplished in view of the foregoing situation, and provides a technique to detect a job on the basis of job history information, despite the job having been executed in a low execution frequency, and allow the setting information of such job to be easily reflected in the setting of a new job.

Solution to Problem

In an aspect, the present invention provides an image forming system including a display device, a controller, a storage device, a search device, a display controller, and an operation device. The controller executes a job. In the storage device, setting information of the job is stored, each time the controller executes the job, in association with date and time of execution of the job, as job history. The search device determines a search period according to date and time of operation performed by a user, and retrieves the job setting information the date and time of execution of which is included in the search period, from the job history stored in the storage device. The display controller causes the display device to display the job setting information retrieved by the search device. The operation device receives an execution instruction of a job to which the job setting information displayed on the display device is applied, from the user. The controller further executes the job according to the execution instruction received by the operation device, by applying the job setting information to the job.

In another aspect, the present invention provides an image forming system including a display device, a controller, a storage device, a search device, a display controller, and an operation device. The controller executes a job. In the storage device, setting information of the job is stored, each time the controller executes the job, in association with a model of an image forming apparatus that has executed the job, and date and time of execution of the job, as job history. The search device retrieves the job setting information associated with the model of the image forming apparatus, from the job history stored in the storage device. The display controller causes the display device to display the job setting information retrieved by the search device. The operation device receives an execution instruction of a job to which the job setting information displayed on the display device is applied, from the user. The controller further executes the job according to the execution instruction received by the operation device, by applying the job setting information to the job.

In still another aspect, the present invention provides an image forming system including an image forming apparatus, and a remote management apparatus including a computer connected to the image forming apparatus via a network. The image forming apparatus includes a display device, a controller, a storage device, a search device, a display controller, an operation device, and a network communication device. The controller executes a job. In the storage device, setting information of the job is stored, each time the controller executes the job, in association with date and time of execution of the job, as job history. The search device determines a search period according to date and time of operation performed by a user, and retrieves the job setting information the date and time of execution of which is included in the search period, from the job history stored in the storage device. The display controller causes the display device to display the job setting information retrieved by the search device. The operation device receives an instruction to select the job corresponding to the job setting information displayed on the display device, and an instruction to select a type of the job, from the user. The network communication device performs data communication with the remote management apparatus. The controller further executes, when the job is selected, the job of the selected type, by applying the job setting information about the selected job. The remote management apparatus includes a managing-side network communication device, a managing-side storage device, and a managing-side controller. The managing-side network communication device receives, from the image forming apparatus, job information about each job executed by the image forming apparatus, at least including the type of the job, the job setting information, an operation time of the job, a data amount of the job, and model information of the image forming apparatus. In the managing-side storage device, the job information about each job received by the managing-side network communication device is stored, as job history. The managing-side controller causes the managing-side network communication device, when the managing-side network communication device receives the type of the selected job and the model information of the image forming apparatus, transmitted from the network communication device, when the operation device of the image forming apparatus receives the instruction to select the job, to transmit recommendation information including either or both of the job setting information indicating a shortest operation time and the job setting information indicating a smallest data amount, among the job setting information corresponding to the type of the job and the model information that have been received, on a basis of the job history stored in the managing-side storage device, to the image forming apparatus. The controller of the image forming apparatus causes the display device, when the network communication device receives the recommendation information from the remote management apparatus, to display the job corresponding to the job setting information included in the recommendation information, and executes, when the operation device receives the instruction to select the job, the job of the type currently selected, by applying the job setting information about the selected job.

Advantageous Effects of Invention

The present invention enables a job to be detected on the basis of job history information, despite the job having been executed in a low execution frequency, and allows the setting information of such job to be easily reflected in the setting of a new job.

BRIEF DESCRIPTION OF DRAWINGS

FIG. 3 is a table schematically showing a job history stored in a storage device of the image forming apparatus.

FIG. 4 is a table schematically showing a job history stored in a storage device of a remote management apparatus.

FIG. 6 is a schematic drawing showing an initial screen of a display device of the image forming apparatus.

FIG. 7 is a schematic drawing showing a screen of the display device, displaying the job history.

FIG. 8 is a schematic drawing showing a screen of the display device, displaying history information indicating a plurality of types of jobs in descending order of execution frequency.

FIG. 9 is a schematic drawing showing a screen of the display device, displaying history information indicating a plurality of types of jobs in descending order of execution frequency, and recommendation information.

DESCRIPTION OF EMBODIMENT

Hereafter, an image forming system according to an embodiment of the present invention will be described, with reference to the drawings.

Figure 1:
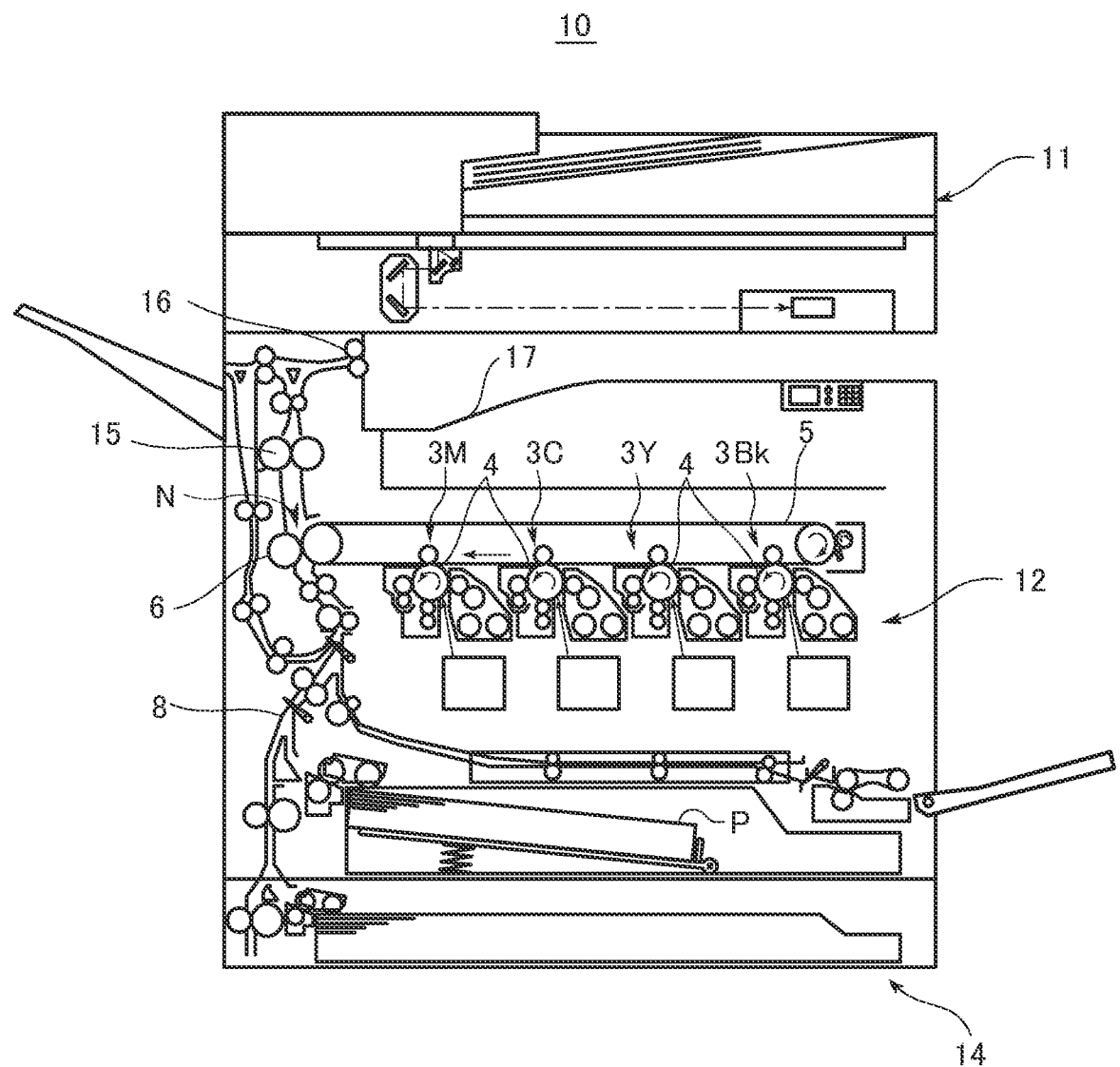
FIG. 1 is a cross-sectional view showing an image forming apparatus in an image forming system according to an embodiment of the present invention.
Figure 2:
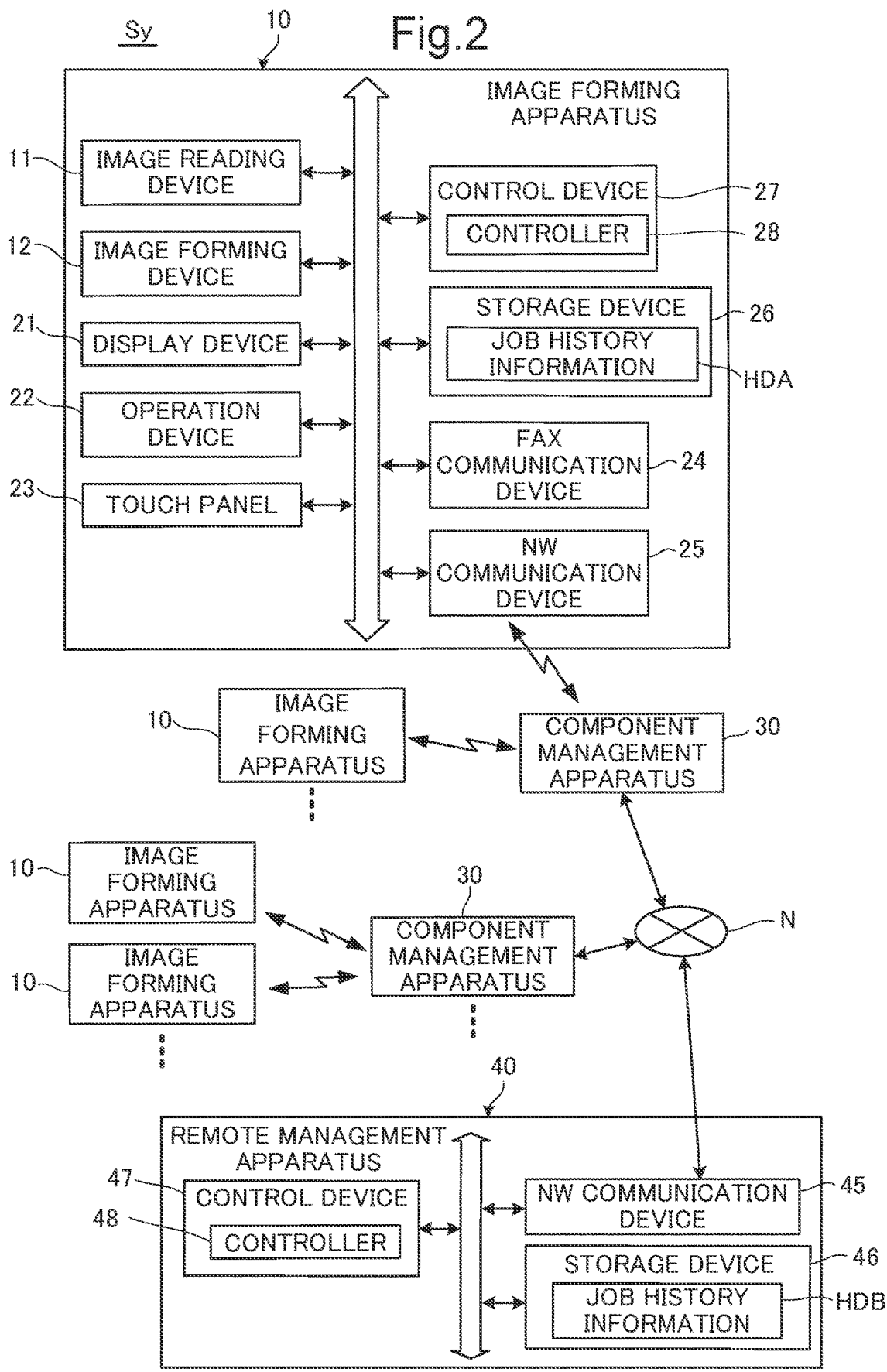
FIG. 2 is a block diagram showing a configuration of the image forming system according to the embodiment.

FIG. 1 is a cross-sectional view showing an image forming apparatus in the image forming system according to the embodiment of the present invention. FIG. 2 is a block diagram showing a configuration of the image forming system according to the embodiment.

The image forming apparatus 10 shown in FIG. 1 is a multifunction peripheral (MFP) configured to execute a plurality of functions including, for example, a copying function, a printing function, and a facsimile function. The image forming apparatus 10 includes an image reading device 11 and an image forming device 12.

The image reading device 11 includes an image sensor that optically reads the image of a source document. An analog output from the image sensor is converted into a digital signal, and image data representing the image of the source document is generated.

The image forming device 12 is configured to print an image represented by the image data on a recording sheet, and includes an image forming unit 3M for magenta, an image forming unit 3C for cyan, an image forming unit 3Y for yellow, and an image forming unit 3Bk for black. In each of the image forming units 3M, 3C, 3Y, and 3Bk, the surface of a photoconductor drum 4 is uniformly charged, and an electrostatic latent image is formed on the surface of the photoconductor drum 4 by exposure. Then the electrostatic latent image on the surface of the photoconductor drum 4 is developed into a toner image, and the toner image on the photoconductor drum 4 is transferred to an intermediate transfer belt 5. Thus, the color toner image is formed on the intermediate transfer belt 5. The color toner image is transferred to the recording sheet P transported along a transport route 8 from a paper feed device 14, at a nip region N defined between the intermediate transfer belt 5 and a secondary transfer roller 6.

Thereafter, the recording sheet P is press-heated in a fixing device 15, so that the toner image on the recording sheet P is fixed by thermal compression, and then the recording sheet P is discharged to an output tray 17 through a discharge roller 16.

As shown in FIG. 2, the image forming system Sy according to this embodiment includes an image forming apparatus 10, a component management apparatus 30, and a remote management apparatus 40. A plurality of image forming apparatuses 10 and component management apparatuses 30 may be provided in the image forming system Sy. In this embodiment, it will be assumed that the image forming system Sy includes a plurality of image forming apparatuses 10 and component management apparatuses 30.

The image forming apparatus 10 includes the image reading device 11, the image forming device 12, a display device 21, an operation device 22, a touch panel 23, a facsimile (FAX) communication device 24, a network (NW) communication device 25, a storage device 26, and a control device 27. The mentioned components are configured to transmit and receive data or signals to and from each other, via a bus.

The display device 21 is, for example, constituted of a liquid crystal display (LCD) or an organic light-emitting diode (OLED) display. The operation device 22 includes physical keys such as a tenkey, an enter key, and a start key.

The touch panel 23 is overlaid on the screen of the display device 21. The touch panel 23 is based on what is known as a resistive film or electrostatic capacitance, and configured to detect a contact (touch) of the user's finger, along with the touched position, and outputs a detection signal indicating the coordinate of the touched position, to a controller 28 of the control device 27 to be subsequently described.

The NW communication device 25 is a communication interface including a communication module such as a non-illustrated local area network (LAN) chip, and connected to the component management apparatus 30 via a wired or wireless LAN, to transmit and receive data to and from the component management apparatus 30. The NW communication device 25 further transmits and receives data to and from the remote management apparatus 40, via the component management apparatus 30 and a network N.

The FAX communication device 24 makes communication via a network with external terminal devices, such as other image forming apparatuses or facsimile machines 40, to transmits and receives the image data, to and from another image forming apparatus or a facsimile machine (not shown), via the network.

The storage device 26 is a large-capacity memory unit such as a solid state drive (SSD) or a hard disk drive (HDD), and contains various application programs and various types of data.

The control device 27 includes a processor, a random-access memory (RAM), a read-only memory (ROM), and so forth. The processor is, for example, a central processing unit (CPU), an application specific integrated circuit (ASIC), or a micro processing unit (MPU). The control device 27 acts as a controller 28, when the processor executes a control program stored in the ROM or storage device 26. The controller 28 acts as the "controller", the "search device", the "display controller", and the "log-in authentication device" in the present invention.

The controller 28 executes overall control of the image forming apparatus 10. The control device 27 is connected to the image reading device 11, the image forming device 12, the display device 21, the operation device 22, the touch panel 23, the FAX communication device 24, the NW communication device 25, and the storage device 26. The controller 28 controls the operation of the mentioned components, and transmits and receives signals or data, to and from each of those components.

The controller 28 serves as a processing device that executes various operations necessary for the image forming operation to be performed by the image forming apparatus 10. The controller 28 also receives operational instructions inputted by the user, in the form of a detection signal outputted from the touch panel 23, or through a press of a physical key of the operation device 22. Further, the controller 28 is configured to control the display operation of the display device 21, and the communicating operation of the FAX communication device 24 and the NW communication device 25.

The plurality of image forming apparatuses 10 are divided into some groups. The component management apparatus 30 is provided for each of such groups, and the NW communication device 25 of each of the image forming apparatuses 10 in the same group is connected to the component management apparatus 30 of the corresponding group via a wired or wireless LAN, to perform data communication with the component management apparatus 30 of the corresponding group. Further, a terminal device such as a user's PC (not shown) performs data communication, via wired or wireless LAN and the component management apparatus 30, with one of the image forming apparatuses 10 belonging to the group of the component management apparatus 30.

The component management apparatus 30 is for example a server, connected to the remote management apparatus 40 via the network N to perform data communication with the remote management apparatus 40, and to relay the data communication performed between each of the image forming apparatuses 10 belonging to the group of the component management apparatus 30, and the remote management apparatus 40.

The remote management apparatus 40 is, for example, a computer including a NW communication device 45, a storage device 46, and a control device 47. The mentioned components are configured to transmit and receive data or signals to and from each other, via a bus.

The NW communication device (managing-side NW communication device) 45 is a communication interface including a communication module such as a non-illustrated LAN chip, and connected to the component management apparatus 30 via a wired or wireless LAN, to transmit and receive data to and from the component management apparatus 30. The NW communication device 45 further transmits and receives data to and from the image forming apparatus 10, via the component management apparatus 30 and the network N.

The storage device (managing-side storage device) 46 is a large-capacity memory unit such as an SSD or HDD, and contains various application programs and various types of data.

The control device 47 includes a processor, a RAM, a ROM, and so forth. The processor is, for example, a CPU, an ASIC, or an MPU. The control device 4 acts as a controller 48, when the processor executes a control program stored in the ROM or storage device 46.

The controller (managing-side control device) 48 executes overall control of the remote management apparatus 40. The control device 47 is connected to the NW communication device 45 and the storage device 46. The controller 48 controls the operation of the mentioned components, and transmits and receives signals or data, to and from each of those components.

The controller 48 serves as a processing device that executes various operations to be performed by the remote management apparatus 40. Further, the controller 48 is configured to control the communicating operation of the NW communication device 45.

With the image forming apparatus 10 configured as above, the user inputs his/her identification information ID, through the operation device 22 or the touch panel 23. Upon authenticating and approving the identification information ID, the controller 28 permits the user corresponding to the authenticated identification information ID to use the image forming apparatus 10 (log in in the image forming apparatus 10). Thus, the user can input a desired job to the image forming apparatus 10, thereby causing the image forming apparatus 10 to execute that job.

For example, when the user specifies copying job setting information JD (color or B/W, number of copies, and so forth) through the operation device 22, sets a source document on the image reading device 11, and inputs the execution instruction of the job through the operation device 22, the controller 28 receives the execution instruction. Then the controller 28 causes the image reading device 11 to read the image of the source document, and causes the image forming device 12 to form the source image on the recording sheet, according to the copying job setting information JD.

When the user specifies FAX job setting information JD (destination (telephone number of receiving-end facsimile machine, receiver's name), number of pages, resolution, and so forth) through the operation device 22, sets a source document on the image reading device 11, and instructs to execute the job by touching the start key of the operation device 22, the controller 28 receives the execution instruction. Then the controller 28 causes the image reading device 11 to read the image of the source document, and causes the facsimile communication device 24 to transmit the source image to the destination, according to the FAX job setting information JD.

When the user specifies scanning job setting information JD (destination (USB memory, main memory), resolution, and so forth) through the operation device 22, sets a source document on the image reading device 11, and instructs to execute the job by touching the start key of the operation device 22, the controller 28 receives the execution instruction. Then the controller 28 causes the image reading device 11 to read the image of the source document, and stores the source image in the USB memory or main memory (storage device 26) connected to the image forming apparatus 10, according to the scanning job setting information JD.

As described above, the image forming apparatus 10 executes the copying job, the FAX job, and the scanning job.

The controller 28 stores, each time the controller 28 executes a job, the type of the job, the job setting information JD, the date and time of execution of the job, a setup time of the job, and the user's identification information ID in the storage device 26, as job history HDA. In addition, the controller 28 causes the NW communication device 25 to transmit, each time the controller 28 executes a job, the type of the job, the job setting information JD, the date and time of execution of the job, the setup time of the job, a data amount of the job (amount of data to be printed, scanned, or transmitted via facsimile; in the case of copying, data amount is zero), and the model information KD of the image forming apparatus 10 to the remote management apparatus 40 via the component management apparatus 30, as job information. On the part of the remote management apparatus 40, when the NW communication device 45 receives the type of the job, the job setting information JD, the date and time of execution of the job, the setup time of the job, the data amount of the job, and the model information KD of the image forming apparatus 10, the controller 48 stores the mentioned information in the storage device 46, as job history HDB. However, it suffices that the job information at least includes the type of the job, the job setting information, the setup time of the job, the data amount of the job, and the model information of the image forming apparatus.

The type of the job includes the copying job, the FAX job, the scanning job, and so forth. The job setting information includes the items that have to be specified to execute the job, such as whether color or B/W, the number of copies or pages, simplex or duplex, resolution, density, destination, and output destination. The date of execution of the job is the information including at least the date and the day of the week that the job has been executed. The date and time of execution is the information including the time of the day and the date that the job has been executed. The setup time of the job refers to a time from the start of the user's operation performed before the execution of the job, to input the execution instruction, to the finish of such operation. The model information KD of the image forming apparatus 10 indicates the model of the image forming apparatus 10 employed for the job.

FIG. 3 illustrates an example of the job history HDA stored in the storage device 26 of the image forming apparatus 10. As shown in FIG. 3, the job history HDA includes the type of the job, the job setting information JD, the date and time of execution of the job, the setup time of the job, and the user's identification information ID stored by the controller 28, in association with each of the jobs. The job history HDA is generated by the controller 28, with respect to each of the image forming apparatuses 10.

FIG. 4 illustrates an example of the job history HDB stored in the storage device 46 of the remote management apparatus 40. As shown in FIG. 4, the job history HDB includes the type of the job, the job setting information JD, the date and time of execution of the job, the setup time of the job, the data amount of the job, and the model information KD of the image forming apparatus 10, stored in association with each of the jobs.

The job history HDB is generated by the remote management apparatus 40, by acquiring, from each of the image forming apparatus 10, the type of the job, the job setting information JD and so forth of the jobs executed by the image forming apparatus 10. The job history HDB is shared by each of the image forming apparatuses 10.

As described above, the job history HDA is stored in the storage device 26 of the image forming apparatus 10, and the job history HDB is stored in the storage device 46 of the remote management apparatus 40. The controller 28 of the image forming apparatus 10 applies, when executing a job according to the instruction from the user inputted through the operation device 22 or the touch panel 23, the setting information JD included in the history information, on the basis of the job history HDA stored in the storage device 26 and, if need be, also the job history HDB acquired through the data communication with the remote management apparatus 40, to the setting information for the new job, the execution of which has been instructed by the user.

Figure 5A:
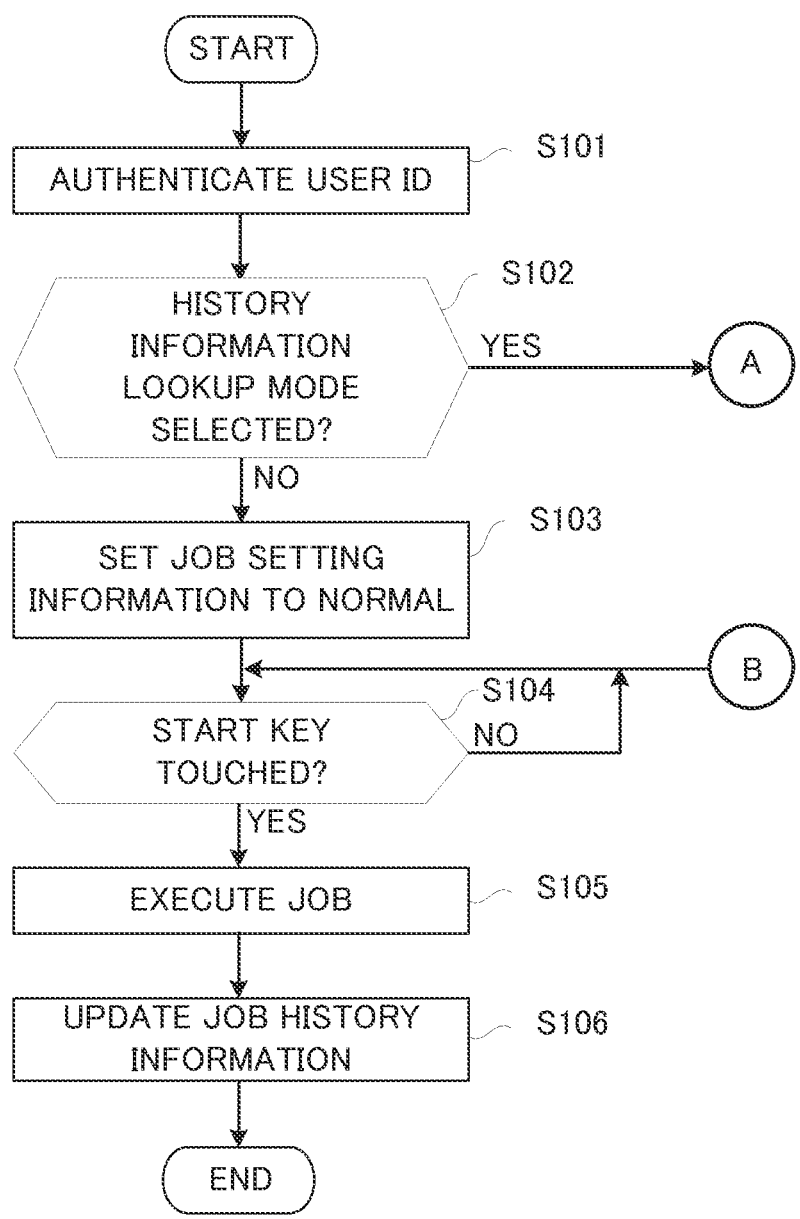
FIG. 5A is a flowchart showing an operation procedure for setting job setting information utilizing the job history.
Figure 5B:
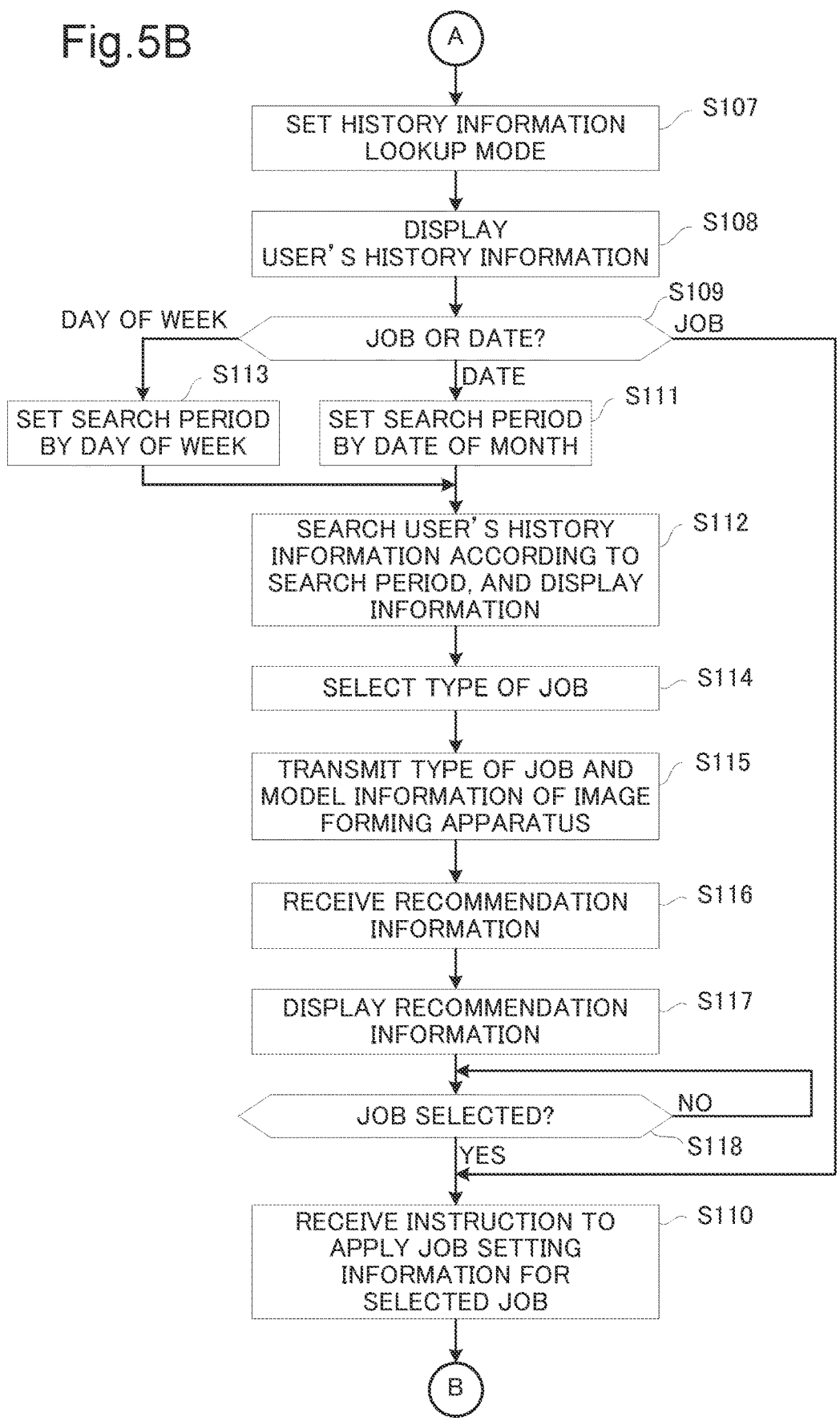
FIG. 5B is a flowchart showing an operation procedure that follows FIG. 5A.

Referring now to flowcharts shown in FIG. 5A and FIG. 5B, description will be given on an operation procedure for specifying the job setting information JD for the new job, the execution of which has been instructed, using the job history HDA stored in the storage device 26 of the image forming apparatus 10, and the job history HDB stored in the storage device 46 of the remote management apparatus 40.

When the user inputs the identification information ID through the operation device 22 or touch panel 23 of the image forming apparatus 10, the controller 28 authenticates the user's identification information ID, and permits the user to use the image forming apparatus 10, when the identification information ID is a legitimate one (S101).

At this point, an initial screen G1 is displayed on the display device 21 as shown in FIG. 6, under the control of the controller 28. The initial screen G1 includes a plurality of function keys 51a, 51b, 51c, . . . respectively associated with the copying job, the FAX job, the scanning job, . . . and a function key 51h associated with a history information look-up mode. When the user touches, for example, the function key 51a associated with the copying job, to input the instruction to select one of the copying operation, the facsimile operation, and the scanning operation, the instruction to select the copying operation associated with the function key 51a is inputted through the touch panel 23, as selection of the type of the job. Then the controller 28 decides that the setting of the history information look-up mode has not been instructed (No at S102), and causes the display device 21 to display a screen for specifying the copying job setting information JD, to specify the copying job setting information JD on the screen, according to the operation performed by the user on the operation device 22 or touch panel 23 (S103). When the user places the source document on the image reading device 11 and instructs the execution of the job by touching the start key of the operation device 22 (Yes at S104), the controller 28 receives the execution instruction, and executes the copying job in accordance with the copying job setting information JD specified at S103, in other words causes the image reading device 11 to read the image of the source document, and causes the image forming device 12 to form the source image on the recording sheet (S105).

Upon finishing the copying job, the controller 28 stores the type of the job, the job setting information JD, the date and time of execution of the job, the setup time of the job, and the user's identification information ID in the storage device 26, as job history HDA, and updates the job history HDA (S106). The controller 28 also causes the NW communication device 25 to transmit the type of the job, the job setting information JD, the date and time of execution of the job, the setup time of the job, the data amount of the job, and the model information KD of the image forming apparatus 10 to the remote management apparatus 40, via the component management apparatus 30. When the NW communication device 45 of the remote management apparatus 40 receives the type of the job, the job setting information JD, the date and time of execution of the job, the setup time of the job, the data amount of the job, and the model information KD of the image forming apparatus 10, the controller 48 stores the received information in the storage device 46 as the job history HDB, and updates the job history HDB.

In the case of other types of the job, such as the FAX job and the scanning job, the job history HDA and the job history HDB are updated, in the similar way to the case of the copying job.

Thus, when the copying job, the FAX job, or the scanning job is executed, the controller 28 specifies the job setting information JD, so that the job is executed according to the job setting information JD, and the job history HDA and the job history HDB are updated.

When the user touches the function key 51h associated with the history information look-up mode, thus inputting the instruction to set the history information look-up mode, and then inputs the instruction to select the type of the job, for example by touching one of the function keys 51a to 51c to select the job associated with the touched function key, the controller 28 decides that the instruction to set the history information look-up mode has been received (Yes at S102), and activates the history information look-up mode (S107).

When the history information look-up mode is activated, the controller 28 searches the job history HDA in the storage device 26, and retrieves all the jobs associated with the user's identification information ID authenticated at S101, from the job history HDA, together with the type, the job setting information JD, the date and time of execution, and the setup time. The controller 28 then sorts the type of the job, the job setting information JD and so forth in the order of the date and time of execution, and causes the display device 21 to display the type of the job, the date and time of execution, and a part of the job setting information JD on the screen, with respect to each of the jobs (S108). For example as shown in FIG. 7, the controller 28 sorts the copying job, the FAX job, and the scanning job in the order of the date and time of execution, and causes the display device 21 to display the type of the job, the date and time of execution, and a part of the job setting information JD on the screen, with respect to each of the jobs. When the user performs a slide operation on a scroll bar 65, the controller 28 receives the scroll instruction through the touch panel 23, and scrolls the display of the jobs.

In the example shown in FIG. 7, color or B/W is displayed as a part of the copying job setting information JD, the destination of the source image is displayed as a part of the FAX job setting information JD, and the output destination of the source image is displayed as a part of the scanning job setting information JD.

The controller 28 also causes the display device 21 to display a selection box 61 for selecting a date of the month, a selection box 62 for selecting a day of the week, a reference key 63, and a setting key 6, on the screen.

When the user touches the display region of one of the jobs on the screen of the display device 21 shown in FIG. 7, thus inputting the instruction to select a specific job, in other words the job displayed at the touched display region ("Job" at S109), the controller 28 receives, through the touch panel 23, the instruction to apply the setting information of the selected job to the type of the job selected at S102 (S110).

The controller 28 further causes the display device 21 to display a screen for modifying the setting information for the selected job. The controller 28 then receives the instruction to modify the job setting information JD according to the user's operation performed on the operation device 22 or touch panel 23, and modifies the job setting information JD, according to the modification instruction.

Thereafter, the controller 28 stands by for the user to touch the start key of the operation device 22 (No at S104), and when the start key is touched (Yes at S104), the controller 28 executes the job selected at S102, according to the job setting information for the job selected at S109 (S105).

Then the controller 28 stores the type of the job, the job setting information JD, the date and time of execution of the job, the setup time of the job, and the user's identification information ID, of the job executed at S105, in the job history HDA, and updates the job history HDA. The controller 28 also causes the NW communication device 25 to transmit the type of the job, the job setting information JD, the date and time of execution of the job, the setup time of the job, the data amount of the job, and the model information KD of the image forming apparatus 10 to the remote management apparatus 40, via the component management apparatus 30. When the NW communication device 45 of the remote management apparatus 40 receives the type of the job, the job setting information JD, the date and time of execution of the job, the setup time of the job, the data amount of the job, and the model information KD of the image forming apparatus 10, the controller 48 stores the received information in the job history HDB, and updates the job history HDB (S106).

When the user operates the operation device 22 or touch panel 23, so as to select a date using the selection box 61 on the screen of the display device 21 shown in FIG. 7, and then touches the reference key 63 thus inputting the setting instruction of the selected date, the controller 28 receives the setting instruction designating the date shown in the selection box 61, through the touch panel 23 ("Date" at S109), and defines, with the designated date set as the date and time of operation, a predetermined period including such date and time of operation at the center, for example three days including the designated date, the day before, and the day after, as search period ΔT (S111). The controller 28 defines such three days in each of the preceding months, as the search period ΔT. For example, when the day 19 is selected as the date of the month, the controller 28 defines the search period ΔT as January 18 to 20, February 18 to 20, March 18 to 20, and so on. Here, at S109, the controller 28 may set the time of the day as the date and time of operation, according to the input by the user through the operation device 22 or touch panel 23, instead of the date of the month. In this case, the controller 28 defines a predetermined period including such date and time of operation at the center, for example three hours including the designated time of the day, one hour before, and one hour after, as the search period ΔT (S111).

The controller 28 searches the job history HDA in the storage device 26, and extracts the jobs associated with the user's identification information ID authenticated at S101, and the date of execution of which is included in the search period ΔT determined at S111, from the job history HDA (S112). The controller 28 then acquires the execution frequency of the job, with respect to the jobs of each type, and sorts the jobs of each type in descending order of the execution frequency, and also sorts a part of the job setting information JD with respect to the jobs of each type, in the order based on a predetermined condition. The controller 28 causes the display device 21 to display the sorted jobs on the screen (S112).

Further, when the user operates the operation device 22 or touch panel 23, as in the case of the date, so as to select a day of the week using the selection box 62 on the screen of the display device 21 shown in FIG. 7, and then touches the reference key 63 thus inputting the setting instruction of the selected day of the week, the controller 28 receives the setting instruction designating the day of the week shown in the selection box 62, through the touch panel 23 ("Day of Week" at S109), and defines a predetermined period including such day of the week at the center, for example three days including the designated day of the week, the day before, and the day after, as search period ΔT (S113). The controller 28 defines such three days in each of the preceding weeks, as the search period ΔT. For example, when Wednesday is selected as the day of the week, the controller 28 defines the search period ΔT as Tuesday, Wednesday, and Thursday of each week. Here, it suffices that the "date and time of operation" and the "date and time of execution" in the present invention are indicated by a date when the search is performed with respect to the date of the month, or by a day of the week, when the search is performed with respect to the day of the week.

Then the controller 28 searches the job history HDA in the storage device 26, and extracts the jobs associated with the user's identification information ID authenticated at S101, and the date of execution (date and time of execution of the job, when the designated date and time of operation represents the date and time of execution of the job) of which is included in the search period ΔT determined at S113, from the job history HDA (S112). The controller 28 then acquires the execution frequency of the job, with respect to the jobs of each type, and causes the display device 21 to display user history information R, indicating the jobs of each type sorted in descending order of the execution frequency, and also a part of the job setting information JD with respect to the jobs of each type, sorted in the order based on a predetermined condition (S112).

For example, when the controller 28 extracts the copying jobs, the FAX jobs, and the scanning jobs, the controller 28 causes the display device 21 to display the user history information R in which the copying jobs, the FAX jobs, and the scanning jobs are sorted in descending order of the execution frequency, as shown in FIG. 8. Further, in the case of the copying jobs, the controller 28 acquires the execution frequency of each of color copying and B/W copying, and displays the color and B/W sorted in descending order of the execution frequency, with the number of copies made, in each of the jobs. In the case of the FAX jobs, the controller 28 acquires the execution frequency of each of the destinations, and displays the destinations in descending order of the execution frequency, with the number of pages transmitted to each of the destinations. In the case of the scanning jobs, the controller 28 acquires the execution frequency of each of the image output destination (USB, main memory (storage device 26), and so on), and displays the output destinations in descending order of the execution frequency, with the number of pages scanned, for each of the output destinations.

Further, when the user touches the display region of one of the jobs included in the user history information R, and then touches the reference key 63, the controller 28 receives, through the touch panel 23, the instruction to select the job displayed in the touched display region (S114), and causes the NW communication device 25 to transmit the type of the job thus selected and the model information KD of the image forming apparatus 10, to the remote management apparatus 40 via the component management apparatus 30 (S115).

On the part of the remote management apparatus 40, when the NW communication device 45 receives the selected type of the job and the model information KD of the image forming apparatus 10, the controller 48 searches the job history HDB in the storage device 46, and extracts all the jobs of the selected type, and associated with the model information KD, from the job history HDB. The controller 48 sorts all of the extracted jobs in ascending order of the setup time, and selects the job setting information JD indicating the shortest setup time, sorts all of the extracted jobs in ascending order of the data amount, and selects the job setting information JD indicating the smallest data amount, and sorts all of the extracted jobs in ascending order of the resolution, and selects the job setting information JD indicating the lowest resolution. The controller 48 then generates recommendation information Q indicating the selected job setting information JD, and causes the NW communication device 45 to transmit the recommendation information Q to the image forming apparatus 10, via the component management apparatus 30. Here, it suffices that the recommendation information Q includes at least one of the job setting information JD indicating the shortest setup time, the job setting information JD indicating the smallest data amount, and the job setting information JD indicating the lowest resolution.

On the part of the image forming apparatus 10, when the NW communication device 25 receives the recommendation information Q (S116), the controller 28 causes the display device 21 to display the recommendation information Q on the screen (S117). Further, the controller 28 retrieves the job setting information JD selected at S114 from the job history HDA in the storage device 26, and causes the display device 21 to display the retrieved job setting information JD, on the screen.

For example, when the user selects the FAX job in the user history information R, the controller 28 of the image forming apparatus 10 transmits the FAX job as the type of the job, and the model information KD of the image forming apparatus 10, to the remote management apparatus 40. Upon receipt of the type of the job and the model information KD, the remote management apparatus 40 extracts all the FAX jobs executed by the image forming apparatus 10 of the model indicated by the model information KD, from the job history HDB. Then the remote management apparatus 40 generates the recommendation information Q including at least one of the FAX job setting information JD indicating the shortest setup time, the FAX job setting information JD indicating the smallest data amount, and the FAX job setting information JD indicating the lowest resolution, among all of the FAX jobs, and transmits the recommendation information Q to the image forming apparatus 10. When the image forming apparatus 10 receives the recommendation information Q, the controller 28 causes the display device 21 to display the received recommendation information Q on the screen, as shown in FIG. 9. The controller 28 also retrieves the FAX job setting information JD selected by the user from the job history HDA, and causes the display device 21 to also display the retrieved job setting information JD, on the screen.

As result, the user history information R, the recommendation information Q, and the job setting information JD selected by the user are displayed on the screen of the display device 21, as shown in FIG. 9.

When the user touches, in this state, the display region of one of the jobs in the user history information R, one of the jobs included in the recommendation information Q, or one of the jobs indicated by the setting information JD selected by the user, and the setting key 64, on the screen of the display device 21 shown in FIG. 9, the controller 28 receives the instruction to select the job corresponding to the display region that has been touched (Yes at S118), and also receives the instruction to execute the job of the type selected at S102, using the job setting information corresponding to the job selected as above (S110). Thereafter, the operation proceeds to S104.

Then the controller 28 stands by for the user to touch the start key of the operation device 22 (No at S104), and when the start key is touched (Yes at S104), the controller 28 executes the job inputted at S102, using the job setting information corresponding to the job selected at S118 for the job inputted at S102 (S105).

Thereafter, the controller 28 stores the type of the job, the job setting information JD, the date and time of execution of the job, the setup time of the job, and the user's identification information ID, of the executed job in the job history HDA, and updates the job history HDA. The controller 28 also causes the NW communication device 25 to transmit the type of the job, the job setting information JD, the date and time of execution of the job, the setup time of the job, the data amount of the job, and the model information KD of the image forming apparatus 10 to the remote management apparatus 40, via the component management apparatus 30. On the part of the remote management apparatus 40, when the NW communication device 45 receives the type of the job, the job setting information JD, the date and time of execution of the job, the setup time of the job, the data amount of the job, and the model information KD of the image forming apparatus 10, the controller 48 stores the received information in the job history HDB, and updates the job history HDB (S106).

When the user touches the display region of one of the jobs included in the user history information R, and the setting key 64, on the screen of the display device 21 where only the is displayed as shown in FIG. 8 (S112), without the job setting information JD having been selected, and without the recommendation information Q having been received, the operations from S114 to S117 are skipped, and the controller 28 receives the instruction to select the job displayed in the display region that has been touched (Yes at S118), and also the instruction to execute the job of the type selected at S102, using the job setting information for the job of the touched display region (S110). Thereafter, the operation proceeds to S104. At S104, the controller 28 stands by for the user to touch the start key of the operation device 22 (No at S104), and when the start key is touched (Yes at S104), the controller 28 executes the job of the type selected at S102, using the job setting information corresponding to the job selected at S118 (S105).

In this embodiment, as described above, the jobs associated with the user's identification information ID, and the date of execution of which is included in the search period ΔT, are retrieved from the job history HDA, and the job setting information JD of the retrieved jobs is displayed on the screen of the display device 21. Accordingly, even the job setting information JD corresponding to the job of lower execution frequency can be extracted, and displayed on the screen of the display device 21, because of the designation of the search period ΔT. As a result, the user can easily specify the job setting information JD, on the screen.

According to the foregoing embodiment, three days including the date or day of the week designated through the selection box 61 or 62, respectively, and the days before and after that, are defined as the search period ΔT. Therefore, for example when some documents are scheduled to be transmitted by FAX once a month or once a week, designating a date at the month end or weekend, or a day of the week, enables also the setting information JD of the FAX jobs executed the days before and after the designated date or day of the week, to be looked up.

Further, the job setting information JD that matches a predetermined condition, out of the job setting information JD of all the jobs of a given type, executed by the image forming apparatuses 10 of the same model, is displayed as the recommendation information Q, on the screen of the display device 21. Therefore, more appropriate job setting information JD can be easily identified, and specified.

Although the controller 28 defines three days including the date or day of the week designated through the selection box 61 or 62, and the days before and after that, as the search period ΔT in the foregoing embodiment, a period different from three days may be adopted, or a month and day of each year may be selected, and a period including the month and day at the center may be defined as the search period ΔT. Further, in the case where the date and time of execution of the job is stored as the job history HDA, instead of the date of execution of the job, the controller 28 may determine the search period ΔT by the time of day. In this case, the jobs, the date and time of execution of which is included in predetermined hours including the designated time of day at the center, can be extracted.

According to the foregoing embodiment, the controller 28 searches the job history HDA in the storage device 26, and extracts the jobs associated with the user's identification information ID authenticated at S101, and the date of execution of which is included in the search period ΔT determined at S111, from the job history HDA, at S112. However, without limitation to the above, the user authentication at S101 may be skipped, and the controller 28 may extract the jobs included in the search period ΔT determined at S111 from the job history HDA, only on the basis of the date of execution of the job.

Although the search period ΔT is determined on the basis of the date selected at S109, in the foregoing embodiment, the controller 28 may instead regard the date and time that the user was authorized to log in as the date and time of operation, and define a predetermined period including the date and time of operation, and the days before and after that, as the search period ΔT.

Further, the operation performed by the controller 48 of the remote management apparatus 40 according to the foregoing embodiment may be performed by the controller 28 of the image forming apparatus 10.

Although the image forming system according to the present invention includes the image forming apparatus (MFP) in the foregoing embodiment, the present invention is also applicable to a different image forming apparatus, such as a copier, a printer, or a facsimile machine.

Further, the configurations and processings described with reference to FIG. 1 to FIG. 9 are merely exemplary, and in no way intended to limit the present invention to those configurations and processings.

The invention claimed is:

1. An image forming system comprising:
a display device;
a controller that executes a job;
a storage device in which setting information of the job is stored, each time the controller executes the job, in association with date and time of execution of the job, as job history;
a search device that determines a search period according to date and time of operation performed by a user, and retrieves the job setting information the date and time of execution of which is included in the search period, from the job history stored in the storage device;
a display controller that causes the display device to display the job setting information retrieved by the search device; and
an operation device that receives an execution instruction of a job to which the job setting information displayed on the display device is applied, from the user,
wherein the controller executes the job according to the execution instruction received by the operation device, by applying the job setting information to the job,
wherein the search device determines a predetermined period including a day of the week corresponding to the date and time of operation at a center, as the search period in each of weeks up to the date and time of operation, and retrieves the job setting information in which the date and time of execution is included in the search period from the job history stored in the storage device, with respect to each of the weeks.

2. An image forming system comprising:
a display device;
a controller that executes a job;
a storage device in which setting information of the job is stored, each time the controller executes the job, in association with date and time of execution of the job, as job history;
a search device that determines a search period according to date and time of operation performed by a user, and retrieves the job setting information the date and time of execution of which is included in the search period, from the job history stored in the storage device;
a display controller that causes the display device to display the job setting information retrieved by the search device; and
an operation device that receives an execution instruction of a job to which the job setting information displayed on the display device is applied, from the user,
wherein the controller executes the job according to the execution instruction received by the operation device, by applying the job setting information to the job,
wherein the search device determines a predetermined period including a date corresponding to the date and time of operation at a center, as the search period in each of months up to the date and time of operation, and retrieves the job setting information in which the date and time of execution is included in the search period from the job history stored in the storage device, with respect to each of the months.

3. An image forming system comprising:
an image forming apparatus; and
a remote management apparatus including a computer connected to the image forming apparatus via a network,
wherein the image forming apparatus includes:
a display device;
a controller that executes a job;
a storage device in which setting information of the job is stored, each time the controller executes the job, in association with date and time of execution of the job, as job history;
a search device that determines a search period according to date and time of operation performed by a user, and retrieves the job setting information the date and time of execution of which is included in the search period, from the job history stored in the storage device;
a display controller that causes the display device to display the job setting information retrieved by the search device; and
an operation device that receives an instruction to select the job corresponding to the job setting information displayed on the display device, and an instruction to select a type of the job, from the user; and
a network communication device that performs data communication with the remote management apparatus,
the controller executes, when the job is selected, the job of the selected type, by applying the job setting information about the selected job,
the remote management apparatus includes:
a managing-side network communication device that receives, from the image forming apparatus, job information about each job executed by the image forming apparatus, at least including the type of the job, the job setting information, an operation time of the job, a data amount of the job, and model information of the image forming apparatus;
a managing-side storage device in which the job information about each job received by the managing-side network communication device is stored, as job history; and
a managing-side controller that causes the managing-side network communication device, when the managing-side network communication device receives the type of the selected job and the model information of the image forming apparatus, transmitted from the network communication device, when the operation device of the image forming apparatus receives the instruction to select the job, to transmit recommendation information including either or both of the job setting information indicating a shortest operation time and the job setting information indicating a smallest data amount, among the job setting information corresponding to the type of the job and the model information that have been received, on a basis of the job history stored in the managing-side storage device, to the image forming apparatus, and the controller of the image forming apparatus causes the display device, when the network communication device receives the recommendation information from the remote management apparatus, to display the job corresponding to the job setting information included in the recommendation information, and executes, when the operation device receives the instruction to select the job, the job of the type currently selected, by applying the job setting information about the selected job.

* * * * *